Feb. 14, 1956  C. C. J. THELANDER  2,734,390
CLUTCH-PULLEY ASSEMBLY
Original Filed Jan. 27, 1951

INVENTOR
C. C. J. THELANDER
BY
Merrill M. Blackburn
ATTORNEY

United States Patent Office 2,734,390
Patented Feb. 14, 1956

2,734,390

CLUTCH-PULLEY ASSEMBLY

Clement C. J. Thelander, Sterling, Ill., assignor to The Eclipse Lawn Mower Co., Division of Buffalo-Eclipse Corporation, Prophetstown, Ill.

Substituted for abandoned application Serial No. 208,185, January 27, 1951. This application April 29, 1954, Serial No. 426,604

2 Claims. (Cl. 74—230.24)

This is a substitute for abandoned application Serial No. 208,185, filed January 27, 1951.

This invention relates to power lawn mowers and particularly to the power transmitting unit of such a mower. The purpose of this invention is to provide a clutch which is easily actuated, to provide an improved clutch which is positive in its action, and to provide such further objects, advantages, and capabilities as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
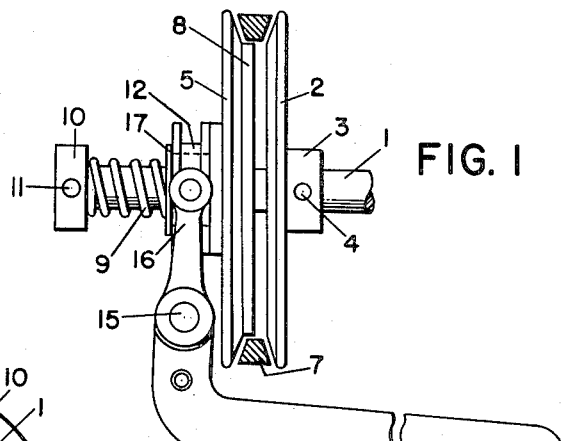
Fig. 1 shows the clutch in open or non-engaged position.
Figure 2:
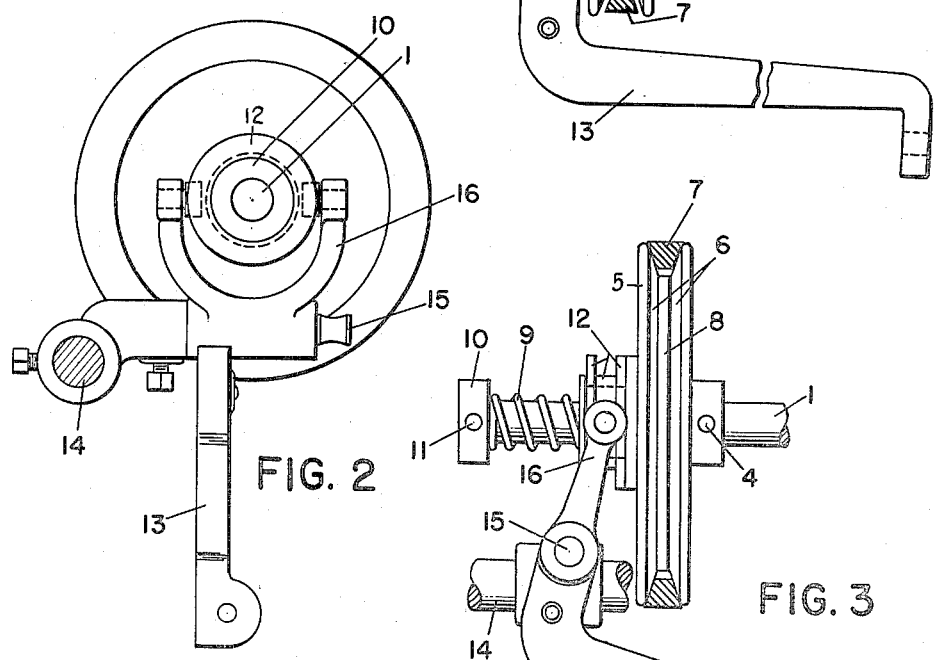
Fig. 2 shows the clutch in face view.
Figure 3:
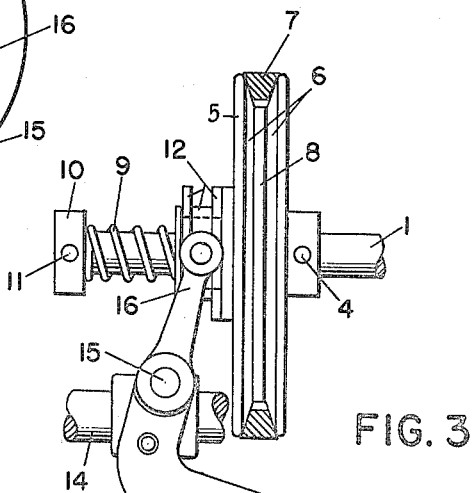
Fig. 3 is a view similar to Fig. 1 but in engaged position.
Figure 4:
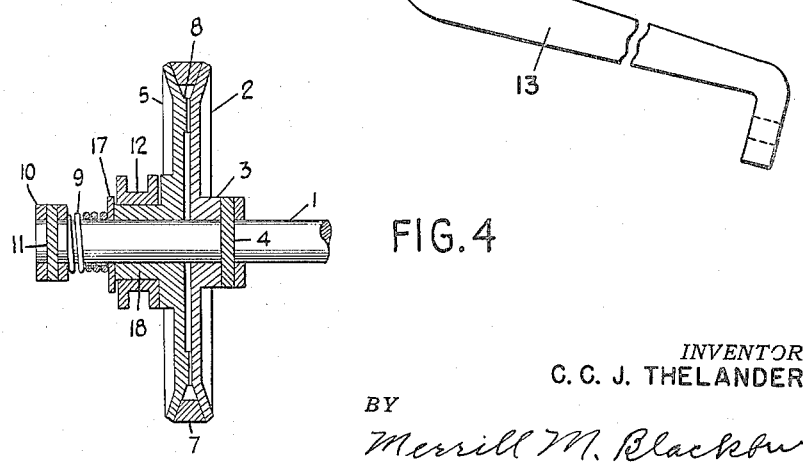
Fig. 4 is a longitudinal section through the clutch.

Reference will now be made in greater detail to the annexed drawings for a more complete description of this invention. The power shaft 1 has a half-sheave or plate 2 secured thereto by a collar 3, fastened by a pin 4. The plate 2 is a part of the clutch which comprises, in addition, a plate 5. The plates 2 and 5 have secured thereto or are integral therewith plates with bevel edges 6 which form a channel for the reception of a belt or cable 7. A plate 8 projects from the inner face of one element of the clutch, for example, one of the plates 6, to limit the distance by which the movable plate may approach the fixed plate when the clutch actuator or sleeve 12 is actuated. This plate 8 also serves to keep the belt from going in between the plates 2 and 5 when they are separated in throwing the clutch out of engagement. If this were to take place, the belt would wedge in between the plates.

A collar 10 is secured by a pin 11 to the shaft 1 and furnishes an abutment for the spring 9 which causes engagement of the clutch. The half sheave 5 has a hub 18 which projects inside of the sleeve 12 into contact with washer 17 so that, when the spring 9 presses inwardly against the hub, it forces the hub and, with it, the half sheave 5 inwardly against the half sheave 2 so that the clutch is engaged.

A lever 13, pivotally mounted on a shaft 14, may be turned on its pivot 15 and will force the clutch actuator or grooved sleeve 12 away from the plate 2 with the result that the clutch is disengaged. The lever engages the actuator 12 by a fork 16 and, as pointed out above, may be swung counterwise, as viewed in Fig. 1, to shift the clutch actuator or grooved sleeve 12 and the washer 17 to the left, thereby relieving the pressure of the spring against the end of the hub of the plate or half-sheave 5, thereby permitting the latter to move away from the plate or half-sheave 2 to cause the shaft 1 to discontinue driving the mower. The washer 17 is interposed between the spring 9 and the actuator 12. When the actuator or sleeve 12 is retracted from the plate or half-sheave 2, the belt or cable 7 does not act to drive the shaft 1. The lever 13 and the fork 16 carried thereby can be adjusted by adjusting the bearing or lever 13 on the shaft 14.

The clutch plate or half-sheave 5, with its hub and the plate 8, is freely rotatable and slidable on the power shaft 1, and the washer 17 is not rigidly connected to, but merely bears against, the end of the hub of the clutch plate or half-sheave 5. Similarly, the clutch actuator or grooved sleeve 12 is both rotatable on and shiftable axially relative to the hub of the clutch plate or half-sheave 5. Therefore, when the clutch control lever 13 is shifted to disengage the clutch by forcing the sleeve 12 to the left, as viewed in Fig. 1, away from the hub of the plate or half-sheave 5, moving the sleeve 12 against the thrust washer 17 and pressing the spring 9, the plate or half-sheave 5 is free to rotate idly and to move away from the plate or half-sheave 2 which is fixed to the power shaft 1. The driving belt 7 drops down upon the cylindrical plate 8, rotating the plate 5 idly, but power is no longer transmitted to the plate 2 and the power shaft 1, since the plate 5 is not now forced against the plate 2. The power shaft 1, therefore, comes to rest, as does the thrust washer 17, the grooved sleeve 12, and the spring 9, the only part rotating being the plate or half-sheave 5. Nevertheless, but slight wear occurs since there is no axial pressure against the plate 5 in the disengaged position of the clutch.

It is of course understood that the specific description of structure set forth above may be departed from without departing from the spirit of this invention as disclosed in this specification and as defined by the appended claims.

Having now described my invention, I claim:

1. A clutch-pulley assembly comprising a power shaft to be driven, a fixed plate fixed thereto, a movable plate rotatable on the driven shaft and movable axially relative to said fixed plate, said plates having beveled belt-receiving faces, said movable plate having a cylindrical collar adapted to receive a belt when the plates are separated, said movable plate having a hub, a second collar at a fixed distance from said first plate in axially spaced-apart relation with respect to the end of said hub, a thrust-washer bearing against the end of said hub, a spring bearing at one end against said second collar and at the other end against said washer, a grooved sleeve slidable axially on and rotatable relative to said hub, said sleeve being adapted to bear against said washer for compressing said spring and moving said other end of said spring away from said end of said hub, thereby relieving said movable plate of said spring pressure and freeing said movable plate for idle rotation relative to said fixed plate when the separation of said plates permits said belt to rest on the cylindrical portion of said movable plate, and means for moving said grooved sleeve.

2. The combination, in a clutch-pulley assembly, of shaft having a fixed collar, a second fixed collar on the shaft, a clutch plate affixed to the first fixed collar, a second clutch plate having a hub with a grooved sleeve on the hub and loose thereon, the grooved sleeve being freely rotatable on the hub and free from the clutch plates and the shaft for sliding and rotary motion, the plates, when compressed, forming a pulley, a spring surrounding the shaft and exerting pressure between the second fixed collar and the hub to cause approach of the plates toward each other when the spring is not compressed, a lever for actuating the grooved sleeve, a fork engaging the groove sleeve to cause separation of the plates, said lever being connected to the fork, a V-belt running over the pulley, and a cylindrical extension on the inner face of the second clutch plate being adapted to fit against the adjacent face of the first clutch plate when the spring is extended, the clutch plates being beveled to provide a V-belt pulley, the second clutch plate being rotatably mounted on the shaft.

References Cited in the file of this patent

UNITED STATES PATENTS

| | | |
|---|---|---|
| 1,857,324 | Okumara | May 10, 1932 |
| 2,165,431 | Wellman | July 11, 1939 |
| 2,385,360 | Johnson | Sept. 25, 1945 |
| 2,491,248 | Carroll | Dec. 13, 1949 |

FOREIGN PATENTS

| | | |
|---|---|---|
| 2,441 | Great Britain | 1879 |
| 434,899 | Germany | July 14, 1925 |